US 11,962,262 B2

(12) United States Patent
Nielsen et al.

(10) Patent No.: US 11,962,262 B2
(45) Date of Patent: Apr. 16, 2024

(54) WIND TURBINE WITH VIRTUAL SYNCHRONOUS GENERATOR AND DC LINK CONTROL

(71) Applicant: VESTAS WIND SYSTEMS A/S, Aarhus N (DK)

(72) Inventors: John Godsk Nielsen, Hornslet (DK); Torsten Lund, Fredericia (DK); Esmaeil Ebrahimzadehveshareh, Copenhagen (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 354 days.

(21) Appl. No.: 17/419,244

(22) PCT Filed: Dec. 16, 2019

(86) PCT No.: PCT/DK2019/050391
§ 371 (c)(1),
(2) Date: Jun. 28, 2021

(87) PCT Pub. No.: WO2020/135905
PCT Pub. Date: Jul. 2, 2020

(65) Prior Publication Data
US 2022/0085740 A1    Mar. 17, 2022

(30) Foreign Application Priority Data

Dec. 28, 2018    (DK) .......................... PA 2018 70865

(51) Int. Cl.
*H02P 9/10*    (2006.01)
*F03D 7/02*    (2006.01)
(Continued)

(52) U.S. Cl.
CPC ............ *H02P 9/105* (2013.01); *F03D 7/0284* (2013.01); *F03D 9/25* (2016.05); *F03D 13/20* (2016.05);
(Continued)

(58) Field of Classification Search
CPC .......... F03D 7/0284; F03D 9/25; F03D 13/20; F03D 80/82; F05B 2270/1033; H02P 9/105; H02P 2101/15; H02P 2103/20
See application file for complete search history.

(56) References Cited

FOREIGN PATENT DOCUMENTS

CN    102257720 A  *  11/2011  ............. H02P 23/12
CN    106451536 A  *  2/2017
(Continued)

OTHER PUBLICATIONS

European Patent Office, Communication Pursuant to Article 94(3) EPC for Application 19 823 902.2-1202 dated Jan. 23, 2023.
(Continued)

*Primary Examiner* — Viet P Nguyen
*Assistant Examiner* — Thomas K Quigley
(74) *Attorney, Agent, or Firm* — Patterson + Sheridan, LLP

(57) ABSTRACT

The invention relates to a method for controlling a wind turbine as virtual synchronous machine by determining the synchronous machine rotational speed rotational speed and the synchronous machine angle. The virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, the synchronous machine angle is determined based on an integration of the synchronous machine rotational
(Continued)

speed, and the damping power is determined based on the virtual synchronous machine rotational speed.

18 Claims, 6 Drawing Sheets

(51) Int. Cl.
    *F03D 9/25*       (2016.01)
    *F03D 13/20*     (2016.01)
    *F03D 80/80*     (2016.01)
    *H02P 101/15*    (2016.01)
    *H02P 103/20*    (2016.01)

(52) U.S. Cl.
    CPC ...... *F03D 80/82* (2016.05); *F05B 2270/1033* (2013.01); *H02P 2101/15* (2015.01); *H02P 2103/20* (2015.01)

(56) References Cited

FOREIGN PATENT DOCUMENTS

| | | | | |
|---|---|---|---|---|
| CN | 109004854 A | * | 12/2018 | ............... H02J 3/38 |
| EP | 2963759 B1 | * | 9/2018 | ............. F03D 7/045 |
| WO | 2020135905 A1 | | 7/2020 | |

OTHER PUBLICATIONS

Marwan Rosyadi et al., "Low Voltage Ride-Through Capability Improvement of Wind Farms Using Variable Speed Permanent Magnet Wind Generator," Electrical Machines and Systems (ICEMS), 2011 International Confernce on, IEEE, Aug. 20, 2011 (Aug. 20, 2011), pp. 1-6, XPO32020118 (D1).

Javier Roldan-Perez et al., "Virtual Synchronous Machine Control of VSC HVDC for Power System Oscillation Damping," IEEE, 2018, 6 pages.

Olve Mo et al., "Evaluation of Virtual Synchronous Machines With Dynamic or Quasi-Stationary Machine Models," IEEE Transactions on Industrial Electronics, vol. 64, No. 7, Jul. 2017, 12 pages.

Xiaodong Liang, "Emerging Power Quality Challenges Due to Integration of Renewable Energy Sources," IEEE Transactions on Industry Applications, vol. 53, No. 2, Mar./Apr. 2017, 12 pages.

Tang et al., "The Role of Power Electronics in Future Low Inertia Power Systems," IEEE, 2018, 6 pages (D4).

Danish Patent and Trademark Office 1st Technical Examination for Application No. PA 2018 70865 dated Aug. 16, 2019.

Sun et. al., "Stability Analysis of Photovoltaic Virtual Synchronous Generators," 2018 China International Conference on Electricity Distribution (CICED), Conference Proceedings Article, p. 1938-1944, Sep. 17, 2018.

PCT Notification of Transmittal of the International Search Report and the Written Opinion of the International Searching Authority, or the Declaration for Application No. PCT/DK2019/050391 dated Feb. 18, 2020.

Bala Kameshwar Poolla, "Placement and Implementation of Grid-Forming and Grid-Following Virtual Inertia and Fast Frequency Response," IEEE, Jan. 9, 2019.

\* cited by examiner

WIND TURBINE WITH VIRTUAL SYNCHRONOUS GENERATOR AND DC LINK CONTROL

FIELD OF THE INVENTION

The invention relates to wind turbines, particularly to wind turbines configured to exhibit a virtual synchronous generator response.

BACKGROUND OF THE INVENTION

In order to allow a much higher penetration of renewable energy sources such as wind turbine into the electrical grid, some countries propose some requirements to equip the power converters with grid-forming properties similar to conventional synchronous generators. These requirements can be address by configuring the renewable power generating units as virtual synchronous machines VSM.

With normal implementations of virtual synchronous machines, the power delivered to the grid may be heavily fluctuating after a low voltage condition and the power of the wind turbine generator is unloaded during the fault and fluctuating after the fault.

Accordingly, it is a problem the implementation of the virtual synchronous machine generates power oscillations after a grid fault and generates increased mechanical loads on the drive train and other mechanical components.

Accordingly, an implementation of the virtual synchronous machine which addresses these problems is strongly needed.

SUMMARY OF THE INVENTION

It is an object of the invention to improve control of wind turbines to alleviate one or more of the above mentioned problems, and therefore to provide a method which provides improved control methods of virtual synchronous machines.

In a first aspect of the invention, a method for controlling a wind turbine is presented, where the wind turbine comprises a power generator, a machine side converter, a line side converter, a DC link and a chopper electrically connected to an output of the machine side converter and an input of the grid side converter, the method comprises determining a rotational speed and a synchronous machine angle, where the virtual synchronous machine rotational speed is determined based on a combination of a feedback of a damping power, a power reference for the desired power output of the wind turbine, a grid power supplied by the wind turbine to a power grid and a chopper power dissipated by the chopper and an inertial integration model, where the synchronous machine angle is determined based on an integration of the synchronous machine rotational speed, and where the damping power is determined based on the virtual synchronous machine rotational speed.

The chopper power dissipated by the chopper may be added to the grid power and the difference between the power reference and the sum of the chopper power and the grid power is feed into the inertial integration model which determines the integration of the power difference.

Thus, in view of the inertial integration it follows that the derivative of the synchronous machine rotational speed is indicative of a deviation, e.g. difference, between the power reference for the desired power output of the wind turbine and the sum of grid power supplied by the wind turbine to a power grid, the chopper power and the damping power.

The idea of the first aspect of the invention is to dissipate power in the DC link chopper and use this power dissipation in a swing equation of the virtual synchronous machine model. Due to this, a smoother performance during low voltage and over voltage ride through events is achieved with a more stable and controllable current injection during the fault and reductions in power oscillations and mechanical loads in the voltage recovery phase after a grid fault.

Advantageously, by including the chopper power in the determination of the power deviation between the power reference and the produced grid power, the power generated by the generator can be reduced gradually so that drive train oscillations are reduced.

According to an embodiment, the power output from the wind turbine is controlled based on the synchronous machine angle.

According to an embodiment, a chopper power reference for the chopper is determined based on a comparison of a DC-link voltage with a DC-link voltage reference and/or a comparison of the grid power with the power reference.

According to an embodiment, the determination of the damping power based on the virtual synchronous machine rotational speed comprises high-pass filtering the synchronous machine rotational speed and determining the damping power based on high-pass filtered signal.

According to an embodiment, the method comprises
 obtaining a network voltage at a connection point of the output of the wind turbine,
 determining a rotational speed of the grid based on the network voltage, and
 determining the damping power based on the virtual synchronous machine rotational speed and the rotational speed of the grid.

According to an embodiment the comparison of the DC-link voltage with the DC-link voltage reference comprises determining a contribution to the chopper power reference dependent on a voltage difference of the DC-link voltage and the DC-link voltage reference and a comparison of the voltage difference with a voltage threshold.

According to an embodiment the comparison of the grid power with the power reference comprises determining a contribution to the chopper power reference dependent on a power difference between the grid power and the power reference and a comparison of the power difference with a power threshold.

According to an embodiment the chopper power is determined dependent on a voltage measurement of the DC-link voltage, alternatively dependent on both DC-link voltage and a measured current flowing to/from the DC link capacitor.

According to an embodiment, the method comprises
 determining a machine side power reference for the machine side converter based on the power reference and a power adjustment value, where the power adjustment value is determined based on a difference between the DC-link voltage reference and the DC-link voltage.

Advantageously, the DC link voltage is controlled by feeding forward the grid power reference and by use of a DC link controller which adjusts the generator power reference to keep the DC link voltage at its reference value.

A second aspect of the invention relates to a control system for controlling a wind turbine which comprises a power generator, a machine side converter, a line side converter, a DC link and a chopper electrically connected to an output of the machine side converter and an input of the grid side converter, the control system is arranged to determine a virtual synchronous machine rotational speed and a synchronous machine angle, where the virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, where the synchronous machine angle is determined based on an integration of the synchronous machine rotational speed, and where the damping power is determined based on the virtual synchronous machine rotational speed.

A third aspect of the invention relates to a computer program product comprising software code adapted to control a wind turbine when executed on a data processing system, the computer program product being adapted to perform the method of the first aspect.

A fourth aspect of the invention relates to a wind turbine comprising a control system according to the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
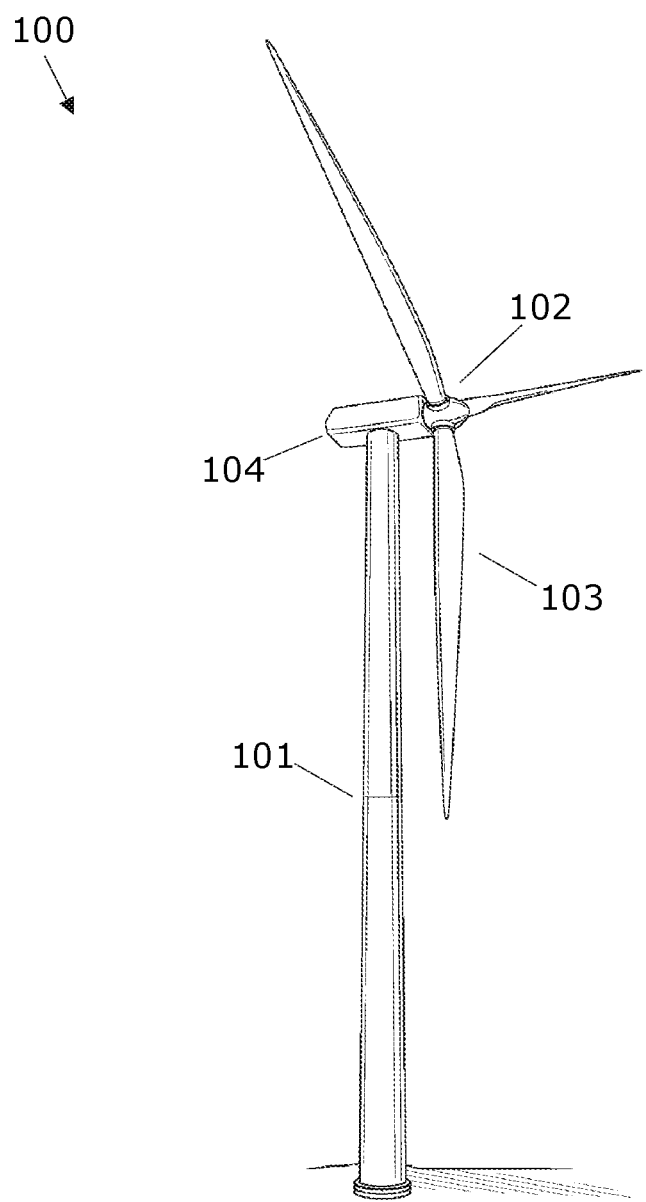
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a machine side converter and a line side converter. The machine side converter converts the generator AC power into DC power and the line side converter converts the DC power into an AC power for injection into the utility grid.

Figure 2A:
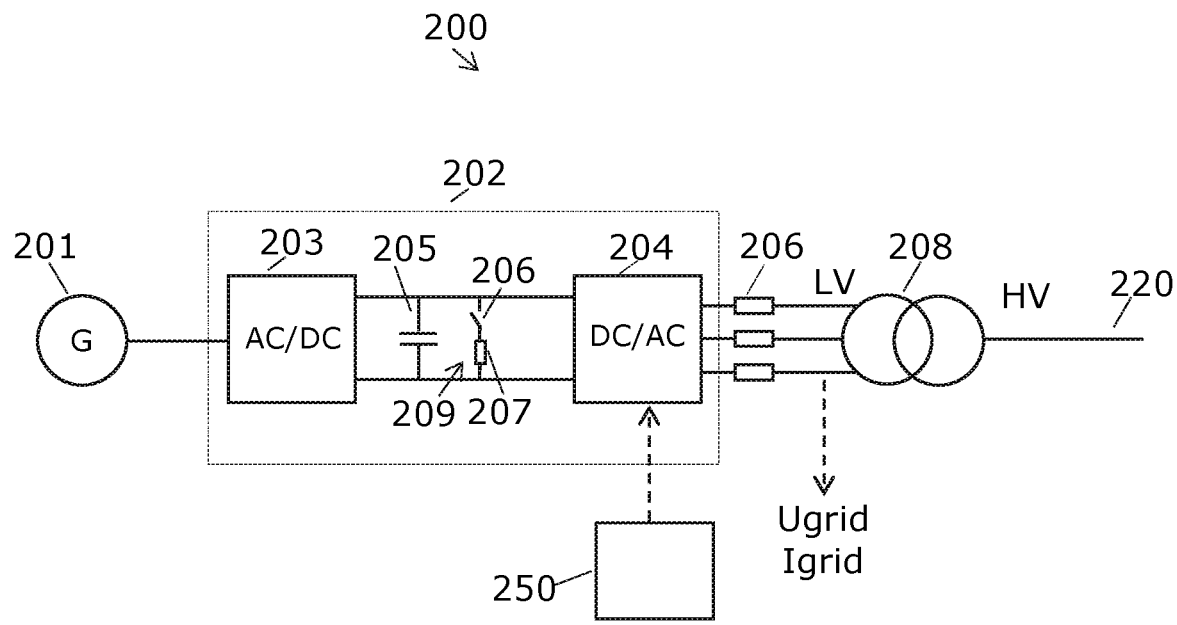
FIG. 2A shows a power system of a wind turbine.

FIG. 2A shows an example of a power system 200 of a wind turbine 100 according to an embodiment. The power system comprises a generator 201 and a power converter 202. The power converter 202 comprises a machine side converter 203, a line side converter 204, a DC-link 205 and a resistor 207 connected with a controllable switch 206. The resistor and switch forms a power dissipation device, also known as a chopper 209, for dissipating active power. The DC-link 205 comprises on or more DC-link capacitors which are charged by the DC output current from the machine side converter 203 or current from the line side converter 204. The output AC current from the line side converter 204 is supplied via output inductors 206 and possibly via a wind turbine transformer 208 to the power line 220.

The power line 220 may be a medium voltage power bus which receives power from other wind turbines 100. The power line 220 may be connected with a high voltage network, e.g. via further transformers. Thus, the power line 220 and one or more power systems 200 of corresponding wind turbines constitutes a wind power plant or park arranged to supply power to a utility grid for distribution of electrical power.

The power converter 202 may be full-scale converter configured according to different principles including forced-commutated and line-commutated converters.

The power system 200 is principally illustrated and therefore does not explicitly reveal that the system may be a three phase system. However, principles of the described embodiments apply both to single and multi-phase systems.

The line side converter 204 uses some variant of pulse width modulation (PWM) for converting the DC power into AC power. The control system 250 is used for controlling the modulation of the line side converter 204 and for controlling the reactive current and the active current generated by the line side converter 204.

FIG. 2A shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining Pgrid from grid voltage Ugrid and grid current Igrid. Alternatively, the grid voltage Ugrid may be measured on the high voltage HV side of the transformer and corrected based on the turns ratio of the transformer, or the internal voltage reference Uqref is used instead of the measured voltage Ugrid. Thus, in an alternative, internal voltage references such as Uqref may be used for determining Pgrid and consequently synchronous machine angle θVSM. Thus, the grid current Igrid supplied to the grid can also be measured. The angle of the grid voltage θgrid can for example be determined from the grid voltage Ugrid.

Figure 2B:
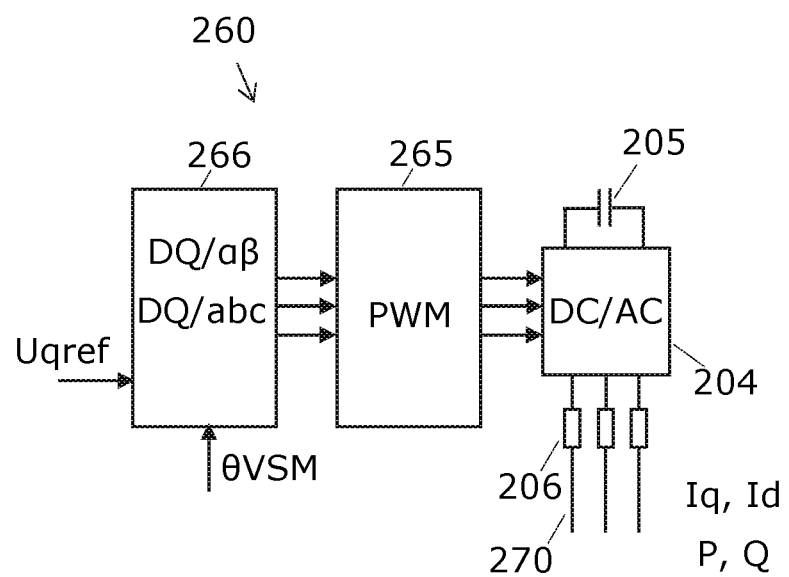
FIG. 2B shows control components arranged for controlling the generation of active current and active power and reactive current and reactive power.

FIG. 2B shows an example of a control components 260 arranged for controlling the generation of active current Iq and active power Pgrid and reactive current Id and reactive power Q supplied to the grid at the power output 270 from the wind turbine. The control components 260 may form part of the control system 250. Alternatively, the control components 260 receive control signals from the control system 250.

References for the active and reactive current references may be received from a Power Plant Controller, PPC, or a Transmission System Operator, TSO, or determined from active and reactive power references, e.g. from the grid operator.

The active power, Pgrid, is controlled via the virtual synchronous machine angle θVSM. Examples for determining the synchronous machine angle θVSM is given elsewhere.

The synchronous machine angle θVSM may be used to transform the signals from the rotating DQ frame into a non-rotating frame such as the αβ or abc frame, or vise-versa. Based on the synchronous machine angle θVSM and the voltage magnitude reference Uqref, control signals for the desired active power and reactive power are determined.

Thus, the synchronous machine angle θVSM may be defined in a rotating DQ frame defined by the angular position θVSM. Based on the synchronous machine angle θVSM, control signals, i.e. the angle of the modulation voltage signals for the pulse-width-modulator PWM, 265 are determined and transformed into a non-rotating frame such as the αβ or abc frame. The modulation Uqref voltage signal controls the reactive current Id and the active current Iq.

The frame conversion and control unit 266 determines the voltage reference signal and transforms the voltage control signal from the DQ frame into the αβ or abc frame. The frame converted output signals from the control unit 266 unit are converted by the pulse-width-modulator PWM, 265 into a modulation signal for the grid side converter 204 in order to generate the voltage based on the θVSM angle that will give the grid power according to the grid power reference.

The reactive power Q is controlled with the amplitude of the grid voltage reference Uqref which is determined based on a reactive power reference. The voltage reference Uqref is converted from the DQ frame to the αβ or abc frame and outputted from the control unit 266 as a control signal to the pulse-width-modulator PWM, 265 which determines the modulation signal for the grid side converter 204.

Figure 3A:
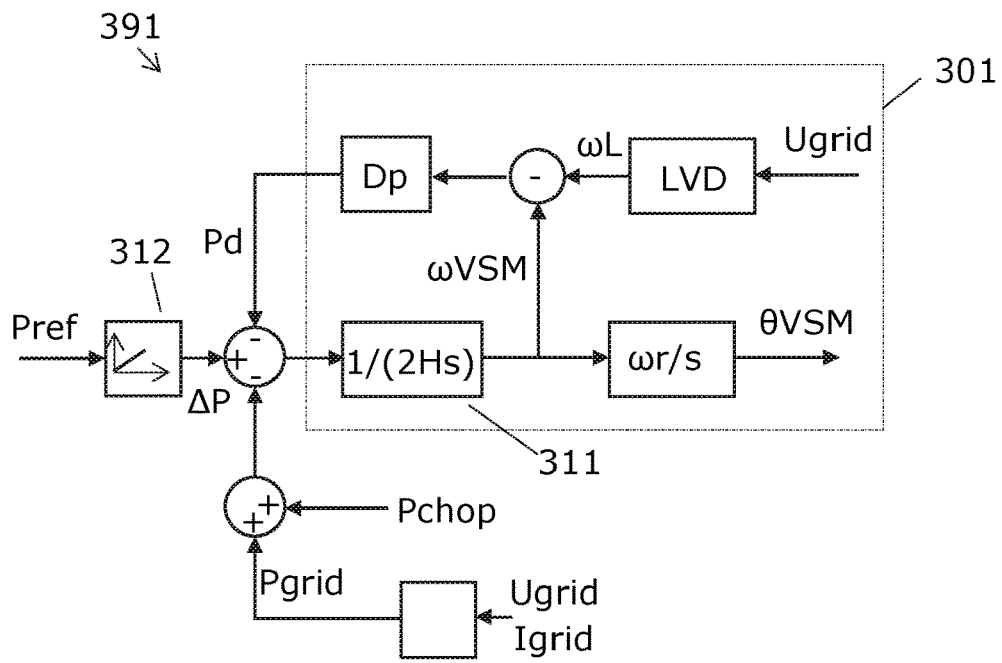
FIG. 3A-B show examples of control systems for determining the synchronous machine angle.
Figure 3B:
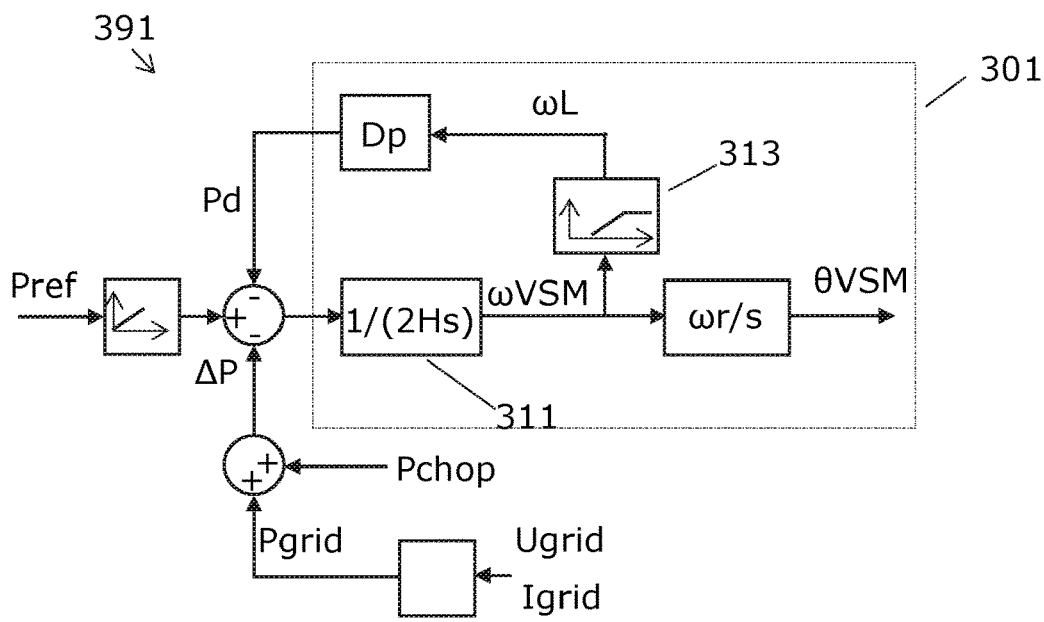

FIG. 3A and FIG. 3B show examples of control systems 391 for determining the synchronous machine angle θVSM. The synchronous machine control systems 391 may be comprised by the control system 250.

The synchronous machine angle θVSM is determined based on a virtual synchronous machine control concept which aims at generating a power response which corresponds to the power response from a real synchronous generator, including the inertia of the synchronous generator.

In response to grid voltage fluctuations, e.g. reflected in the measured Ugrid and Pgrid, which causes the virtual machine to either accelerate or decelerate to reach a new equilibrium condition. The new equilibrium is reached when the measured grid power Pgrid is again following Pref.

The virtual synchronous machine control concept is utilized on the line side converter 204 using a swing equation to calculate θVSM.

During an Under Voltage Ride Through (UVRT) event, the angular speed ωVSM will increase faster than the grid angular speed ωL and at low grid voltage and long duration faults the turbine is at risk of becoming unstable and trip or shut down. It is possible to change the inertia constant H of the swing equation to a high value during the fault, but then the control will not adapt to phase changes or real frequency changes during the UVRT. Embodiments and examples of the present invention dissipates energy in the DC link chopper 209 and use the dissipated energy in the swing equation to have a smoother performance during UVRT/ OVRT with a more stable and controllable current injection during the fault and reduce the power swings in the voltage recovery phase. The advantage is wider voltage tolerance curve without losing synchronism and less mechanical loads in the voltage recovery phase.

FIG. 3A shows an example of an implementation of the virtual synchronous model 301. The virtual synchronous model 301 includes a closed loop where the virtual synchronous machine rotational speed ωVSM is determined based on a combination of a feedback of a damping power Pd, a power reference Pref for the desired active power output of the wind turbine, the active grid power Pgrid supplied by the wind turbine to the grid via the power line 220 and a chopper power Pchop dissipated by the chopper 209 and an inertial integration model 311. The inertial integration model 311 is implemented as 1/(2Hs) where H is the inertia time constant and 1/s is the integration in s-domain. Accordingly, the combination of powers Pref−Pd−Pgrid−Pchop is used as input for the inertial integration model 311.

Since the derivative of the synchronous machine rotational speed ωVSM corresponds to the deviation between the power reference Pref and the grid power Pgrid, the integration of the difference Pref−Pd−Pgrid−Pchop gives the synchronous machine rotational speed ωVSM.

The grid power Pgrid can be determined based on the measured grid voltage Ugrid and the measured current Igrid, e.g. measured at the LV or HV side of the transformer.

Variations in the power reference Pref, i.e. variations per time unit, may be slope limited according to the slope limiter 312.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

The chopper power Pchop can be determined dependent on a measured DC-link voltage, e.g. by means of a voltage detector arranged to measure the voltage over the DC-link capacitor 205 according to the equation Pchop=chop_on*UDC*UDC/Rchop. Rchop is the resistance of the chopper resistor 207 and chop_on is a value between zero and one which indicates the duty-cycle of the switch 206, i.e. the fraction of time where the switch 206 is closed, where chop_on=0.5 may indicate that the switch is closed 50% of a switching period.

FIG. 3B shows an alternative virtual synchronous model 301 which is not based on a measured grid voltage Ugrid, but the damping part, e.g. the damping power Pd, is determined based on a high-pass filtering 313 of the synchronous machine rotational speed ωVSM.

In general, the virtual synchronous model 301 determines the angle θVSM of the virtual machine based on the combination of powers Pref−Pd−Pgrid−Pchop, the inertial integration model 311, e.g. implemented as 1/(2Hs) and a feedback of the damping power Pd determined based on ωVSM and an integration of ωVSM.

The control systems 391 are implementable based on power values Pref, Pd, Pgrid, Pchop but may equivalently be implemented based on corresponding torque values Tref, Td, Tgrid, Tchop based on the relationship where power equals torque times rotation frequency, e.g. the rotational speed of the grid ωL.

Figure 4A:
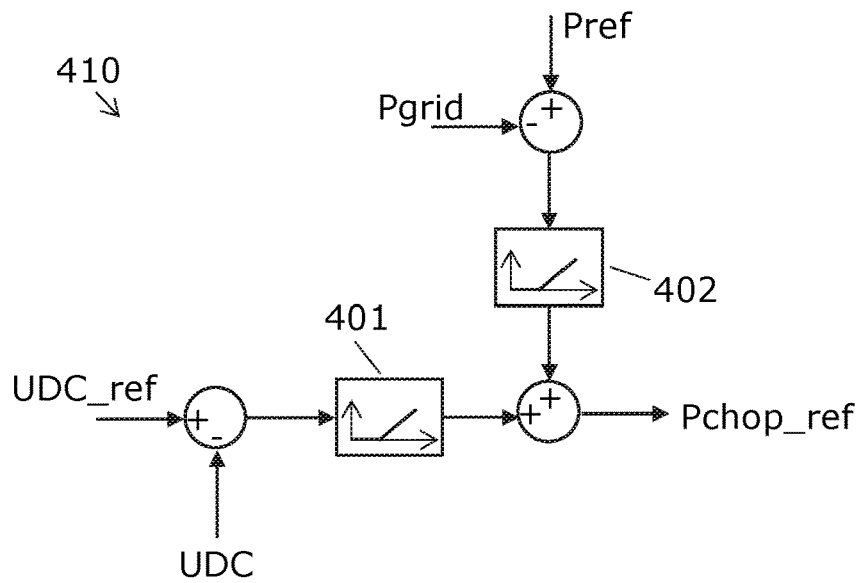
FIG. 4A shows a circuit for determining a chopper power reference for the chopper.

FIG. 4A illustrates a circuit 410 for determining a chopper power reference Pchop_ref for the chopper 209. As illustrated, Pchop_ref can be determined based on the difference of the DC-link voltage, UDC, and the DC-link voltage reference UDC_ref. The DC-link voltage is the voltage across the DC-link capacitor 205. An increase of the DC-link voltage above the reference can be compensated by dissipating DC-link capacitor energy in the chopper according to the chopper reference Pchop_ref. Alternatively, Pchop_ref can be determined based on the difference between the measured grid power Pgrid and the power reference Pref. If the power reference Pref is greater than the grid power Pgrid, e.g. due to a low voltage grid event, the excess energy will cause an increase of the DC-link voltage UDC. The excess energy can be compensated by activating the chopper according to the chopper reference Pchop_ref.

The contribution to the chopper power reference Pchop_ref based on the DC-link voltage UDC and/or the grid power Pgrid may be dependent on a comparison of the voltage and/or power difference with a respective voltage and power thresholds as defined by the voltage and power limit functions 401, 402. Thus, the contribution to the chopper reference from any of the comparisons or difference calculations may be zero if the difference is below the threshold, and if the difference is above the threshold, the limit functions 401, 402 provides a monotonically increasing output as a function of the difference, i.e. voltage or power difference.

As illustrated, the chopper reference Pchop_ref can also be determined based on a combination, e.g. a sum, of the contributions from the DC-link voltage deviation (UDC–ref–UDC) and the contribution of the active power deviation (Pref–Pgrid).

Figure 4B:
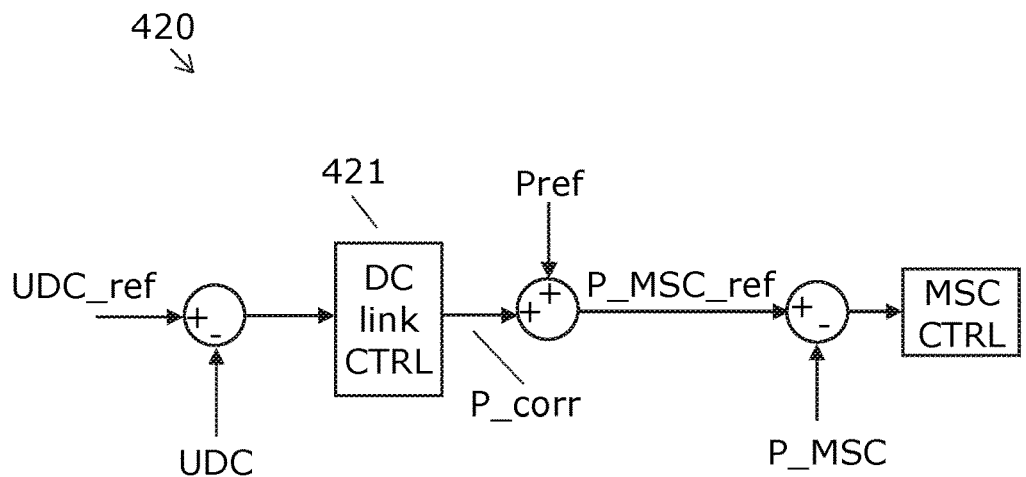
FIG. 4B shows a circuit for determining a power reference for the machine side converter.

FIG. 4B illustrates a circuit 420 for determining a power reference P_MSC_ref for the machine side converter 203 based on the difference between the DC-link voltage reference UDC_ref and the measured DC-link voltage UDC and the power reference Pref. The DC-link controller 421 determines a power adjustment P_corr to be combined with the power reference Pref. Thus, if the DC-link voltage UDC is too high, e.g. above a threshold, with respect to the DC-link reference UDC_ref, P_corr becomes negative so that the machine side power reference P_MSC_ref is reduced relative the power reference Pref. In this way the voltage across the DC link capacitor 205 is controlled.

Figure 5:
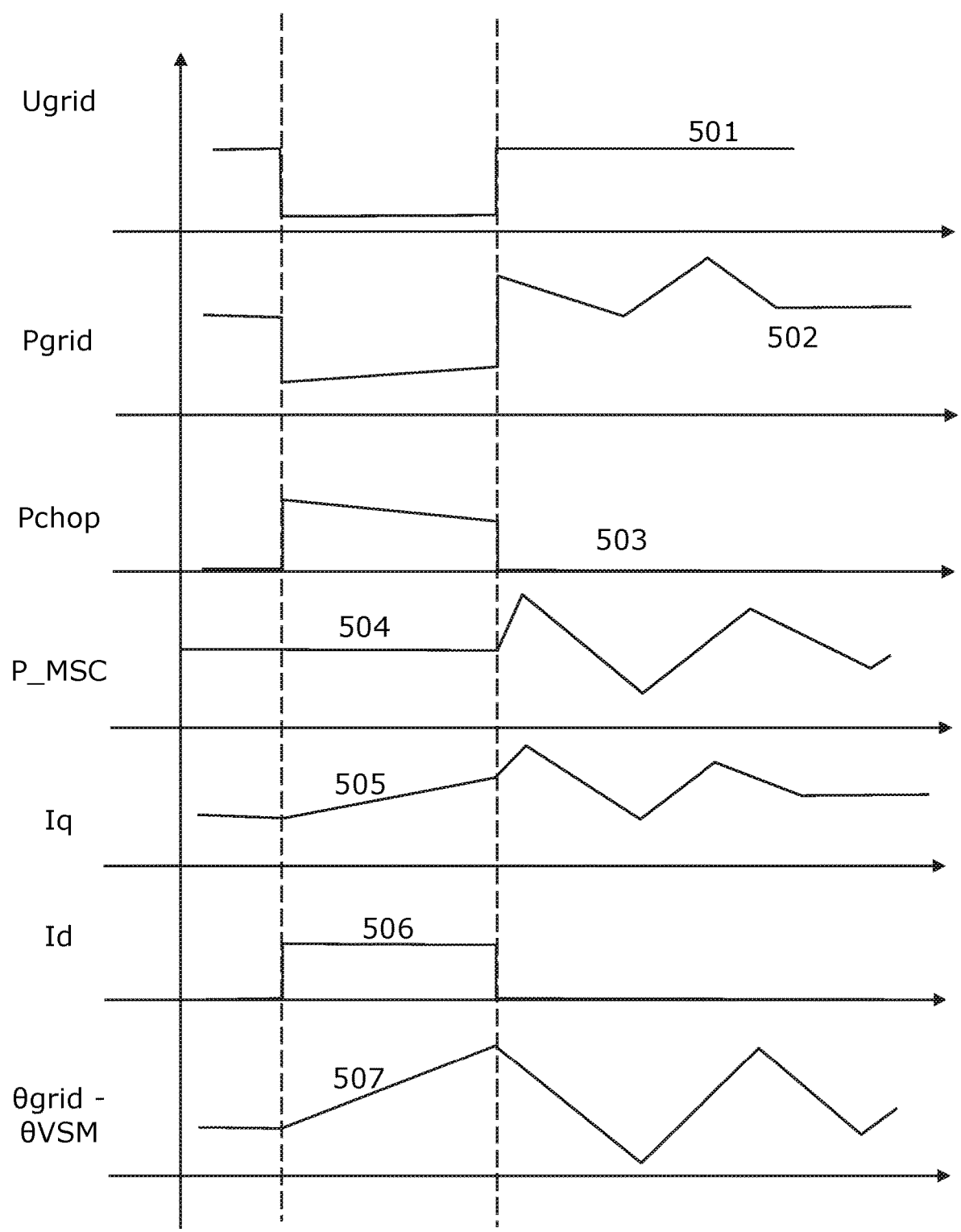
FIG. 5 shows response curves in the event of a Low Voltage Ride Through event for a wind turbine configured with a Virtual Synchronous Machine.

FIG. 5 shows response curves in the event of a Low Voltage Ride Through event for a wind turbine configured with a Virtual Synchronous Machine which is not adapted to include the chopper power Pchop, i.e. the power deviation ΔP equals Pref-Pgrid-Pd.

Curve 501 shows the voltage drop at the measured Ugrid. Due to the voltage drop, the electrical power to the grid Pgrid (curve 502) is instantly reduced. The grid power is increased during the fault, because the virtual synchronous machine (VSM) control will increase the angle between the grid and the synchronous machine angle θVSM. After the grid fault the grid power Pgrid oscillates since the virtual synchronous machine has accelerated up during the fault and will oscillate back to its prefault power level.

The power dissipated in the DC link chopper Pchop, e.g. determined according to the diagram in FIG. 4A is shown in curve 503. The chopper is activated due to a high DC link voltage UDC or a mismatch between the generator power, i.e. the machine side power P_MSC, and the grid power Pgrid. Pchop may be reduced during the fault, as illustrated, to reduce energy capacity needs in the chopper, e.g. by adjusting the chop_on duty cycle.

Curve 504 shows that the machine side power P_MSC, in this example, is kept steady because the chopper is dissipating the power not delivered to the grid. After the fault the P_MSC power is oscillating until the grid side VSM control has returned to its steady state condition.

The active current Iq (curve 505) increases due to the VSM response.

The reactive current Id (curve 506) towards the grid is increased during the fault due to the VSM response with a reactive current to support the grid voltage.

The synchronous machine angle difference (θgrid–θVSM) between the grid angle and the synchronous machine angle (curve 507) increases during the fault due to the deviation between the power reference Pref and the grid power Pgrid.

Figure 6:
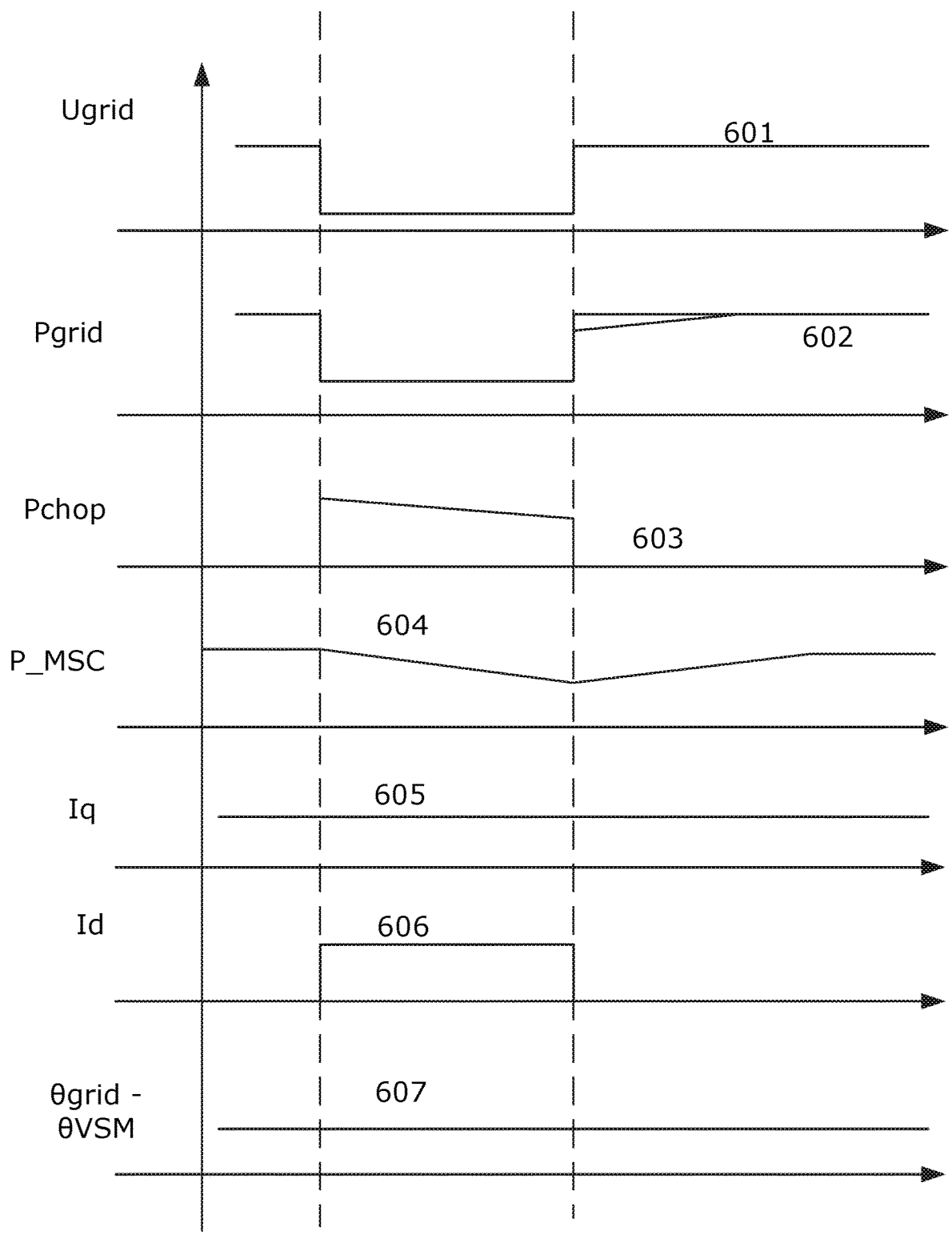
FIG. 6 shows response curves in the event of a Low Voltage Ride Through event for a wind turbine configured with a Virtual Synchronous Machine according to an embodiment of the invention.

FIG. 6 shows response curves in the event of a Low Voltage Ride Through event for a wind turbine configured with a Virtual Synchronous Machine which is adapted to include the chopper power Pchop, i.e. so that the power deviation ΔP equals Pref–Pgrid–Pd–Pchop.

Curve 601 shows the voltage drop at the measured Ugrid. Due to the voltage drop, the electrical power to the grid Pgrid (curve 602) is instantly reduced. After the grid fault the grid power Pgrid recovers slowly without oscillations. This is due to the control method including the chopper power Pchop which has the effect that the virtual synchronous machine is not accelerated up during the fault. That is, the angle difference between the grid θgrid and the synchronous machine angle θVSM is not significantly changed.

The power dissipated in the DC link chopper Pchop, e.g. determined according to the diagram in FIG. 4A is shown in curve 603. The chopper is activated due to a high DC link voltage UDC or a mismatch between the generator power, i.e. the machine side power P_MSC, and the grid power Pgrid. Pchop may be reduced during the fault, as illustrated, to reduce energy capacity needs in the chopper, e.g. by adjusting the chop_on duty cycle.

Curve 604 shows that the machine side power P_MSC is slightly unloaded during the fault and recovers after the grid fault. During normal non-fault conditions, the machine side power P_MSC is typical equal to grid power, but it can be useful to reduce generator power slower than grid power, during the fault, to avoid drive train loads and tower oscillations.

The active current Iq (curve 605) is constant but could also be increased or reduced during the fault to match grid requirements.

The reactive current Id (curve 606) towards the grid is increased during the fault to match either a VSM response or a more converter controllable value and to provide grid voltage support.

The synchronous machine angle difference (θgrid–θVSM) between the grid angle and the synchronous machine angle (curve 607) is almost unchanged during the fault due to the synchronous machine control which takes into account the chopper power Pchop. This increases stability during the fault and minimize power recovery oscillations after the fault.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine, the wind turbine comprises a power generator, a machine side converter, a line side converter, a DC link and a chopper electrically connected to an output of the machine side converter and an input of a grid side converter, the method comprising:

determining a virtual synchronous machine rotational speed and a virtual synchronous machine angle, where the virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, where the virtual synchronous machine angle is determined based on an integration of the virtual synchronous machine rotational speed, and where the damping power is determined based on the virtual synchronous machine rotational speed.

2. The method of claim 1, comprising controlling power output from the wind turbine based on the virtual synchronous machine angle.

3. The method of claim 1, comprising determining a chopper power reference for the chopper, based on a comparison of a DC-link voltage with a DC-link voltage reference or a comparison of the grid power with the power reference.

4. The method of claim 1, where determination of the damping power based on the virtual synchronous machine rotational speed comprises high-pass filtering the virtual synchronous machine rotational speed and determining the damping power based on high-pass filtered signal.

5. The method of claim 1, comprising:
obtaining a network voltage at a connection point of the output of the wind turbine;
determining a frequency of the power grid based on the network voltage; and
determining the damping power based on the virtual synchronous machine rotational speed and the frequency of the power grid.

6. The method of claim 3, where the comparison of the DC-link voltage with the DC-link voltage reference comprises determining a contribution to the chopper power reference dependent on a voltage difference of the DC-link voltage and the DC-link voltage reference and a comparison of the voltage difference with a voltage threshold.

7. The method of claim 3, where comparison of the grid power with the power reference comprises determining a contribution to the chopper power reference dependent on a power difference between the grid power and the power reference and a comparison of the power difference with a power threshold.

8. The method of claim 3, where the chopper power is determined dependent on a voltage measurement of the DC-link voltage.

9. The method of claim 3, comprising:
determining a machine side power reference for the machine side converter based on the power reference and a power adjustment value, where the power adjustment value is determined based on a difference between the DC-link voltage reference and the DC-link voltage.

10. A control system for controlling a wind turbine, the wind turbine comprises a power generator, a machine side converter, a line side converter, a DC link and a chopper electrically connected to an output of the machine side converter and an input of a grid side converter, the control system is arranged to perform an operation, comprising:

determine a virtual synchronous machine rotational speed and a virtual synchronous machine angle, where the virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, where the virtual synchronous machine angle is determined based on an integration of the virtual synchronous machine rotational speed, and where the damping power is determined based on the virtual synchronous machine rotational speed.

11. The control system of claim 10, further comprising determining a chopper power reference for the chopper, based on a comparison of a DC-link voltage with a DC-link voltage reference or a comparison of the grid power with the power reference.

12. The control system of claim 11, where the determination of the damping power based on the virtual synchronous machine rotational speed comprises high-pass filtering the virtual synchronous machine rotational speed and determining the damping power based on high-pass filtered signal.

13. The control system of claim 10, further comprising controlling power output from the wind turbine based on the virtual synchronous machine angle.

14. A computer program product comprising software code adapted to control a wind turbine when executed on a data processing system, the computer program product being adapted to perform an operation for controlling a wind turbine comprising a power generator, a machine side converter, a line side converter, a DC link and a chopper electrically connected to an output of the machine side converter and an input of a grid side converter, the operation comprising:

determining a virtual synchronous machine rotational speed and a virtual synchronous machine angle, where the virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, where the virtual synchronous machine angle is determined based on an integration of the virtual synchronous machine rotational speed, and where the damping power is determined based on the virtual synchronous machine rotational speed.

15. A wind turbine, comprising:
a tower;
a nacelle disposed on the tower and housing a generator;
a rotor extending from the generator and having a plurality of blades disposed on a distal end thereof;
a machine side converter;
a line side converter;
a DC link a chopper electrically connected to an output of the machine side converter and an input of a grid side converter; and a control system configured to perform an operation, comprising:

determine a virtual synchronous machine rotational speed and a virtual synchronous machine angle, where the virtual synchronous machine rotational speed is determined based on a combination of a feedback of a damping power, a power reference for a desired power output of the wind turbine, a grid power supplied by the wind turbine to a power grid and a chopper power dissipated by the chopper and an inertial integration model, where the virtual synchronous machine angle is determined based on an integration of the virtual synchronous machine rotational speed, and where the damping power is determined based on the virtual synchronous machine rotational speed.

16. The wind turbine of claim 15, further comprising determining a chopper power reference for the chopper, based on a comparison of a DC-link voltage with a DC-link voltage reference or a comparison of the grid power with the power reference.

17. The wind turbine of claim 15, where determination of the damping power based on the virtual synchronous machine rotational speed comprises high-pass filtering the virtual synchronous machine rotational speed and determining the damping power based on high-pass filtered signal.

18. The wind turbine of claim 15, further comprising controlling power output from the wind turbine based on the virtual synchronous machine angle.

* * * * *